Sept. 11, 1928.　　　　　　　G. C. HUBBLE　　　　　　　1,684,182
AUTOMATIC VOLTAGE CONTROL
Original Filed March 17, 1926　　2 Sheets-Sheet 1
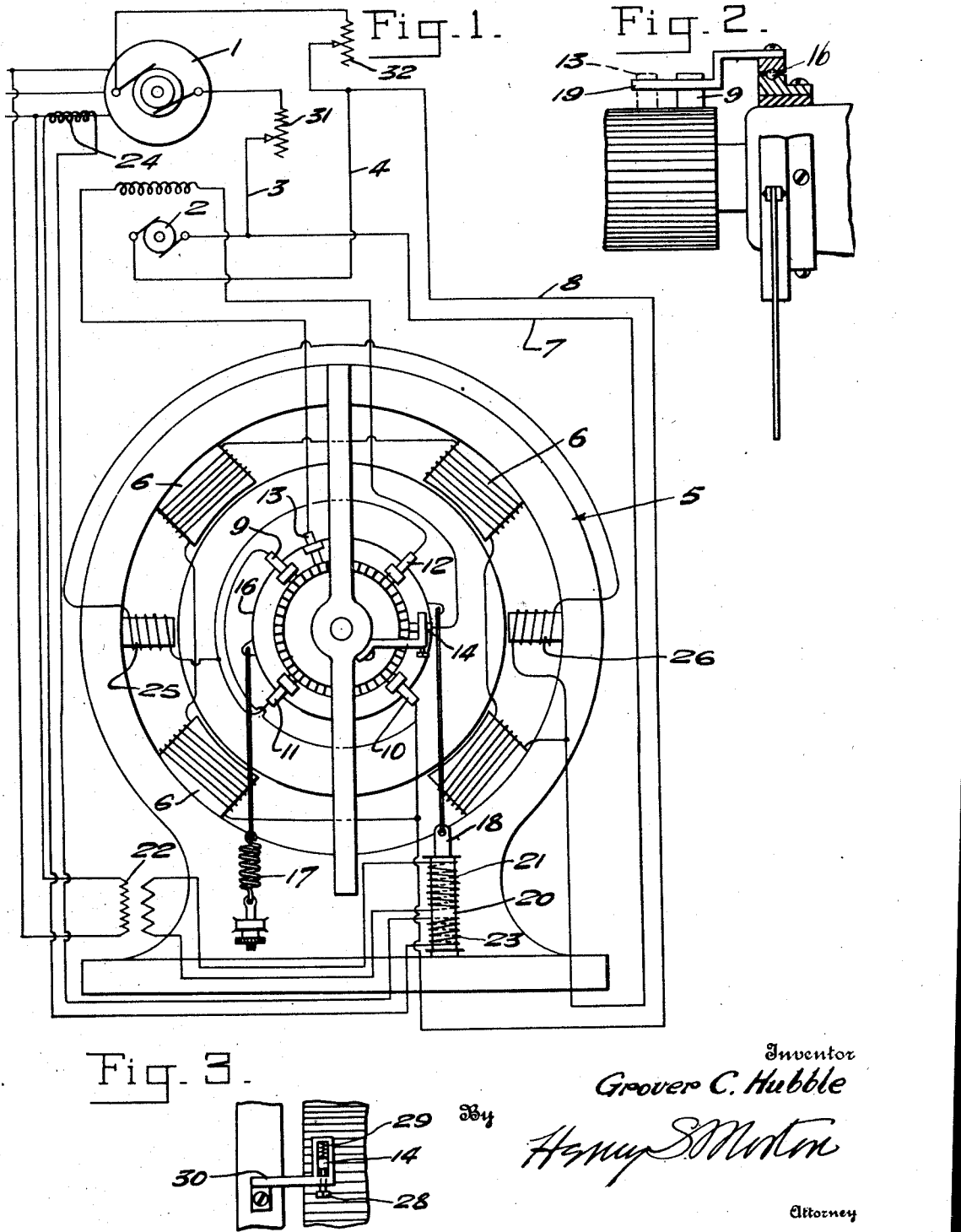
Inventor
Grover C. Hubble
By
Henry S Morton
Attorney Sept. 11, 1928.
G. C. HUBBLE
1,684,182
AUTOMATIC VOLTAGE CONTROL
Original Filed March 17, 1926    2 Sheets-Sheet 2
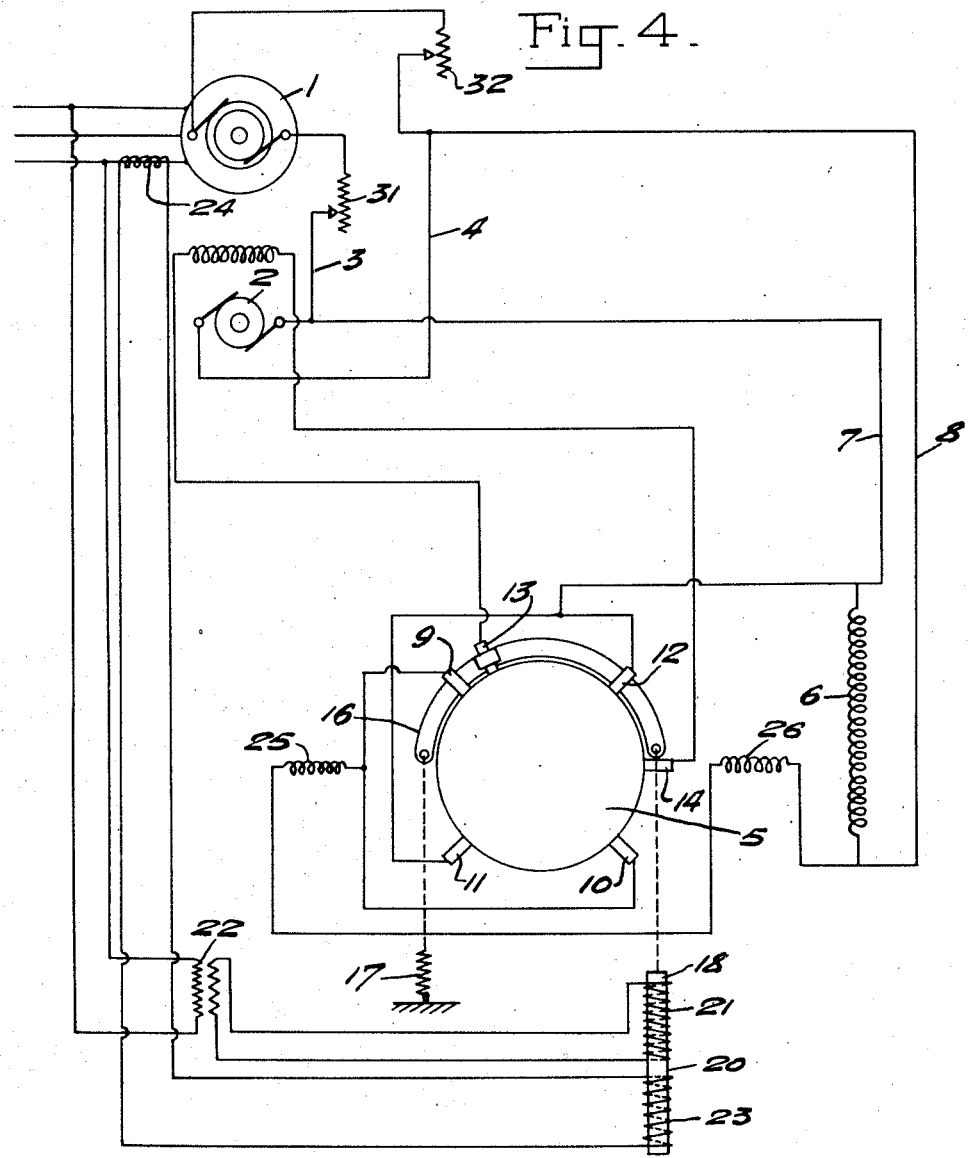
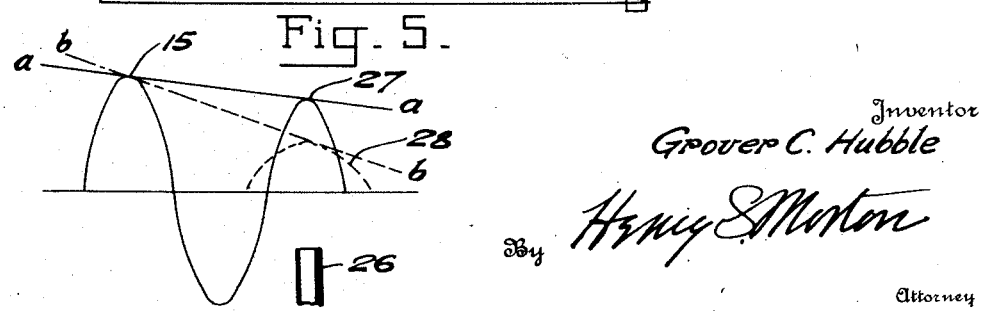
Inventor
Grover C. Hubble
By  Henry S. Morton
Attorney Patented Sept. 11, 1928.

1,684,182

UNITED STATES PATENT OFFICE.

GROVER C. HUBBLE, OF BONNERS FERRY, IDAHO.

AUTOMATIC VOLTAGE CONTROL.

Application filed March 17, 1926, Serial No. 95,443. Renewed February 1, 1928.

This invention relates to systems of automatic voltage control and is a continuation in part of my pending application No. 647,903, filed June 26, 1923. It has for its general object the provision of means for sensitively and automatically controlling the voltage of direct and alternating current generators.

In its more specific definition, the principal object of the invention is to control the voltage of the generator through sensitive automatic regulation of the excitation of the exciter ordinarily associated with such generators, in accordance with the load variations in the output circuit of the generator. This is accomplished by providing a small shunt-wound motor the field of which is in shunt with the armature of the exciter, and by arranging special control brushes in angular relation upon the commutator of the motor armature, and in circuit with the shunt field of the exciter, so that the angular relation of the brushes may be varied to change the difference in potential between said brushes, thereby varying the voltage in the shunt field of the exciter, to produce a compensating effect in the generator, stabilizing the voltage output of the generator.

The object of the invention includes the control of one of the special brushes, by means automatically displacing it circumferentially of the commutator from a position at or adjacent the peak of the voltage wave of the motor armature to a position on the slope of said wave, or vice versa, the control means being responsive to voltage variations in the power line of the generator, either with or without the accelerating effect upon said control means produced by variations of amperage in said power line.

The object of the invention includes also the provision in the motor of interpoles, so positioned relative to the stationary special brush as to diffuse or spread the flux cut by the armature windings connected to the commutator segments as they pass under said brush, depressing the voltage wave peak of said windings and producing a greater voltage drop between the special brushes than would normally exist due to their position of angular displacement alone.

Other objects of the invention will appear as the following description of an illustrative embodiment thereof proceeds.

In the drawings:—

Figure 1 is a diagrammatic representation of an electrical generating system embodying the principles of my invention, showing the control motor and appurtenant controls in side elevation.

Figure 2 is a fragmentary end view showing a portion of the control motor commutator and the ball-race carrying the automatic displaceable special brush.

Figure 3 is a similar view showing the normally fixed special brush.

Figure 4 is a conventionalized wiring diagram of the system.

Figure 5 is a diagram showing the voltage curve and indicating the manner in which the wave form is modified by the interpoles to steepen the voltage drop between the voltage control brushes.

Referring now in detail to the several figures, the numerals 1 and 2 represent respectively an alternating current generator and the exciter associated therewith, said devices being connected in series by the wires 3 and 4.

The numeral 5 represents, in general, a shunt-wound control motor, the field windings 6 of which are connected in shunt with the armature of the exciter by wires 7 and 8. The motor as shown, is provided with four main poles and with main brushes 9, 10, 11 and 12 in circuit with the wires 7 and 8, for energizing the armature of the control motor from the exciter.

A pair of special brushes 13 and 14 are provided, the same being placed on the commutator of the control motor and connected in series with the shunt field of the exciter. The brush 13 is displaceable circumferentially of the commutator through an arcuate range of movement extending from a position adjacent one of the main brushes, for instance the brush 9, to a position more or less remote therefrom. When the brush 13 is close to the brush 9 it is in the maximum flux field of the adjacent main pole and the voltage curve of the current received by this brush from the armature is at maximum peak. This is diagrammatically indicated at 15 in Figure 5. When the brush 13 is moved away from the brush 9 it passes through a flux field of progressively decreasing intensity, in which the potential of the armature windings is lower.

The special brush 14 being normally fixed in position, its potential, in so far as it is affected by the position of the brush alone, is constant, so that the difference in potential between the special brushes at any time, and consequently the voltage in the field of the exciter, varies with the degree of displacement of the brush 13. This means of voltage regulation, in as much as it relates merely to the displaceable brush is old, being known as "third brush control". It has been improved in the exercise of the present invention by displacing the brush 13 automatically through means responsive to voltage variations in the power line or adjunctively, in response to variations in the power line amperage. With this end in view the brush 13 is mounted upon a ball race 16 rotatable axially of the motor shaft, said race being normally biased, in the direction of the maximum potential position of the brush, by a spring 17, and urged in the opposite direction against the tension of said spring by a core 18 reciprocable within a solenoid 20.

The main and special brushes are preferably mounted so as to travel in separate parallel paths relatively to the commutator, as shown in Figure 2, the commutator being made somewhat longer than is customary to permit this arrangement of the brushes. The holder 19 of the brush 9 is preferably extended into the path of the displaceable brush and acts as a stop to limit the movement of the brush under the pull of the spring.

The solenoid 20 is energized by a winding 21 in circuit with a step-down voltage transformer 22 which is connected in shunt with the power line so that variations in load conditions in the power line produce fluctuation in the solenoid, attracting the core 18 and opposing greater or less resistance to the spring 17, moving the brush 13 in one or the other direction.

Let it be assumed that the brush 13 is in a certain intermediate position correct for maintaining constant voltage output of the generator for a given load. Now, if additional load is imposed upon the power line there will be a voltage drop, weakening the solenoid, permitting the spring 17 to pull the brush 13 in the direction of higher potential, increasing the potential drop between the special brushes 13 and 14, and causing an increased current flow through the shunt field of the exciter. This makes the exciter produce more current, thereby increasing the magnetism in the field poles of the generator, boosting the voltage output thereof until normal voltage is reached.

The action of the solenoid 20 may be accelerated, and it may be made equally sensitive to smaller fluctuations in the line voltage, by compounding the voltage winding with a current helix 23, reversely wound, in circuit with a series transformer 24 in one of the power lines.

The increasing amperage which accompanies a voltage drop in the line increases the energization of the current helix simultaneously with the decrease in the strength of the voltage winding, but in a reverse direction, tending to neutralize the strength of the voltage winding, quickly weakening the solenoid. The reverse action takes place when the voltage in the power line rises.

The sensitiveness of the third-brush control is improved by making the armature of the control motor with a greater number of windings than usual, having fewer turns each, producing a very gradual voltage drop in the field circuit of the exciter as the displaceable brush is shifted from one commutator segment to another.

The field of the control motor is provided with a pair of interpoles 25 and 26, preferably arranged midway between the main poles, substantially in a diametrical line with the fixed special brush 14. The windings of these poles are in series with the armature of the control motor and the armature of the exciter, the purpose of the interpoles being to disseminate a magnetic flux which repels or diffuses the flux of the main poles in the region of the brush 14, depressing the voltage peak in the armature windings as they come under said brush, in the manner graphically shown in Figure 5, in which the normal peak at the brush 14 is represented at 27, the dotted curve representing the peak lowered through the effect of the interpoles.

In this figure the solid line $a$—$a$ represents the voltage drop between the special brushes for any given position of the displaceable brush, the line $b$—$b$ representing the voltage drop for the same angular position of the brushes under the influence of the interpoles. It is obvious that an increase in the voltage in the shunt field of the exciter is produced with the assistance of the interpole control, and a quicker stabilization in the voltage output of the generator thereby obtained.

In demonstrating the functioning of the interpoles, the increased current of the exciter resulting from displacement of the brush 13 responsively to a weakening of the solenoid 20 attendant upon a voltage drop in the line, flows by way of the wire 8 serially through the interpoles, one pair of main brushes, the armature of the control motor, the other pair of main brushes, back to the exciter by way of the wire 7. The increased current from the exciter still further increases the flux in the interpoles, this resulting in a further difference in potential between the special brushes, producing a still stronger current in the exciter field, and so on until the normal line voltage is restored. This condition again brings the solenoid and spring 17 into their normal position of balance.

While the special brush 14 normally remains fixed during the operation of the control system, a standing adjustment is obtained by means of the set-screw 28 which acts against the tension of the spring 29 to allocate the brush adjustably circumferentially of the commutator within the stationary holder 30.

It will be observed that the current from the commutator divides, part going to the control motor through wires 7 and 8 and part to generator through wires 3 and 4 the proper distribution of current being regulated by manipulating the variable resistances 31 and 32 arranged in series in the circuit between the exciter and generator.

It is to be understood that the present invention accomplishes a practically instantaneous voltage control with the utilization of only the requisite amount of current necessary to maintain the proper line voltage. In addition the invention produces a steady and almost perfect flow of current through the fields without the use of "make and break" contact or resistance coils.

Owing to the delicate mechanism of voltage control devices now in use it is not possible to operate them successfully on ships or in places where there is unusual vibration. The present voltage control system includes no delicate parts and may be used successfully regardless of vibration conditions.

While I have in the above description defined what I believe to be a preferred and practical embodiment of my invention, it is to be understood that the specific details are not to be regarded as limitative in effect, but only by way of example, except where they are prescribed by the express language of the appended claims.

Having described my invention what I claim as new and desire to secure by Letters Patent, is:—

1. In combination, an alternator, a direct current field exciter generator for said alternator, a control motor electrically driven from the exciter, said control motor being capable of supplying the field energizing current for said exciter, and means whereby the output of the control motor generator will be regulated by the output voltage of the alternator.

2. In combination, a generator, a direct current exciter therefor, a control motor electrically driven from said exciter, said control motor being capable of supplying the field excitation current for said exciter, and means whereby the output of said control motor will be controlled by the output voltage of the generator.

3. In combination, a generator, a direct current exciter therefor, a control motor electrically driven from said exciter, said control motor being capable of supplying the field excitation current for said exciter, and means including an adjustable means whereby the output voltage of said control motor will be controlled by the output voltage of the generator.

4. In combination, an alternator, a field exciting generator therefor with its output leads connected in series with the field of the alternator, a motor interposed in the field circuit of the alternator, means whereby the operation of said motor will produce a direct current to supply the field of said exciter, and means for controlling the current produced by the motor from the output voltage of said alternator.

5. In combination, an alternator, a field exciting generator therefor having its output leads connected in series with the field of the alternator, a control motor interposed in the field circuit of the alternator, an adjustable generator brush for the control motor adapted to be utilized for changing the output voltage of said control motor, means whereby the output of the control motor is utilized for supplying the field exciting current of said exciter, and means whereby the position of the adjustable generator brush of said control motor is controlled by the output voltage of the alternator.

6. In combination, an alternator, a field exciting generator therefor having its output leads connected in series with the field of the alternator, a control motor interposed in the field circuit of the alternator, an adjustable generator brush for the control motor adapted to be utilized for changing the output voltage of said control motor, means whereby the output of the control motor is utilized for supplying the field exciting current of said exciter, yieldable means whereby the adjustable control motor brush will be held to maintain a certain voltage for the field exciting current of said exciter, and electromagnetic means whereby a change in the output voltage of said alternator will move said adjustable brush and change the voltage of the field excitation current for said exciter.

7. In combination, an alternator, a field exciting generator therefor having its output leads connected in series with the field of the alternator, a control motor interposed in the field circuit of the alternator, an adjustable brush for the control motor adapted to be utilized for changing the output voltage of said control motor, means whereby the output of the control motor is utilized for supplying the field exciting current of said exciter, a solenoid, and means whereby said solenoid will operate to move the generator brush with change of output voltage of said alternator.

8. In combination, a generator having a field circuit and a power circuit, means for controlling the field excitation of said generator in response to voltage fluctuations in said power circuit, and means in said field circuit responsive to changes in the field excitation due to the action of said excitation controlling means for exercising augmentative controlling effect upon said control means.

9. In combination, a generator, an exciter therefor and a control motor actuated by said exciter, brushes relatively displaceable, in operative relation to the commutator of said motor, and in circuit with the shunt field of said exciter, and means responsive to voltage fluctuations in the power line of said generator for changing the angle of displacement of said brushes.

10. In combination, a generator, an exciter therefor and a control motor actuated by said exciter, brushes relatively displaceable, in operative relation to the commutator of said motor and in circuit with the shunt field of said exciter, means responsive to voltage fluctuations in the power line of said generator for changing the angle of displacement of said brushes, and means in circuit with the armature of said exciter for varying the potential at one of said brushes.

11. In combination, a generator, an exciter therefor, and a control motor actuated by said exciter, brushes in operative relation to the commutator of said motor and in circuit with the shunt field of the exciter, means for varying the position of one of the brushes relative to the phase of the voltage wave coinciding with said brush, and means for varying the form of the voltage wave at the position of the other brush.

12. In combination, a generator, an exciter therefor, and a control motor actuated by said exciter, brushes in operative relation to the commutator of said motor and in circuit with the shunt field of the exciter, means responsive to voltage changes in the power line of the generator for varying the position of one of the brushes relative to the phase of the voltage wave coinciding with said brush, and means responsive to variations in the voltage of the field circuit of the generator for varying the form of the voltage wave at the position of the other brush.

13. In combination, a generator, an exciter therefor, and a control motor actuated by said exciter, brushes in operative relation to the commutator of said motor and in circuit with the shunt field of the exciter, a solenoid responsive to voltage changes in the power line of the generator and operative through mechanical connections to vary the position of one of the brushes relative to the phase of the voltage wave coinciding with said brush, and an interpole for said motor in circuit with said exciter and subject to the voltage variations thereof produced by varying the position of said brush, for varying the form of voltage wave at the position of the other brush.

14. In combination, a generator, an exciter therefor, and a control motor actuated by said exciter, brushes in operative relation to the commutator of said motor and in circuit with the shunt field of said exciter, and a solenoid including opposed windings, one being responsive to voltage fluctuations in the power line of said generator and the other to the current fluctuations incident to said voltage fluctuations, operative through mechanical connections to vary the position of one of said brushes relative to the phase of the voltage wave coinciding with said brush.

15. In combination, a generator, an exciter therefor, and a control motor actuated by said exciter, brushes in operative relation to the commutator of said motor and in circuit with the shunt field of said exciter, a solenoid including opposed windings, one being responsive to voltage fluctuations in the power line of said generator and the other to the current fluctuations incident to said voltage fluctuations, operative through mechanical connections to vary the position of one of said brushes relative to the phase of the voltage wave coinciding with said brush and an interpole for said motor in circuit with said exciter and subject to the voltage variations thereof produced by varying the position of said displaceable brush, for varying the form of voltage wave at the position of the other brush.

In testimony whereof I affix my signature.

GROVER C. HUBBLE.